United States Patent
Sauers

[19]

[11] Patent Number: 6,134,793
[45] Date of Patent: Oct. 24, 2000

[54] BOW SIGHT ALIGNMENT SYSTEM

[76] Inventor: James C. Sauers, P.O. Box 347, Lake Harmony, Pa. 18624-0347

[21] Appl. No.: 09/065,478

[22] Filed: Apr. 24, 1998

[51] Int. Cl.⁷ .............................. F41G 1/54; G01B 11/27
[52] U.S. Cl. ................................ 33/265; 33/286; 33/293; 33/506; 33/241; 124/87
[58] Field of Search .................. 33/265, 286, 293, 33/506, 241, 234; 124/87; 273/348, 358, 405; 473/569, 570, 578

[56] References Cited

U.S. PATENT DOCUMENTS

| | | | |
|---|---|---|---|
| 3,488,853 | 1/1970 | Altier | 33/265 |
| 4,825,258 | 4/1989 | Whitson | 33/286 |
| 5,446,535 | 8/1995 | Williams | 33/286 |
| 5,448,834 | 9/1995 | Huang | 33/234 |
| 5,486,913 | 1/1996 | Aharon | 33/234 |
| 5,495,675 | 3/1996 | Huang | 33/241 |
| 5,568,265 | 10/1996 | Matthews | 33/286 |

*Primary Examiner*—Christopher W. Fulton
*Attorney, Agent, or Firm*—Michael J. Delaney

[57] ABSTRACT

A laser is adapted for attachment to an arrow such that a beam projected from the laser is colinear with an axis of a shaft of the arrow. A first target has a first marking and a second marking thereon. The first and second markings are positioned such that when the laser is attached to the arrow, and the arrow is drawn on a bow, and the beam from the laser is projected on the second marking, and a person drawing the bow visually aligns the first marking with a sighting pin and a peep sight on a string of the bow, and the bow is a first pre-determined distance away from the first target, the sighting pin is properly aligned for aiming the arrow without the laser thereon from the bow toward a second target which is positioned a second pre-determined distance away from the bow.

4 Claims, 2 Drawing Sheets

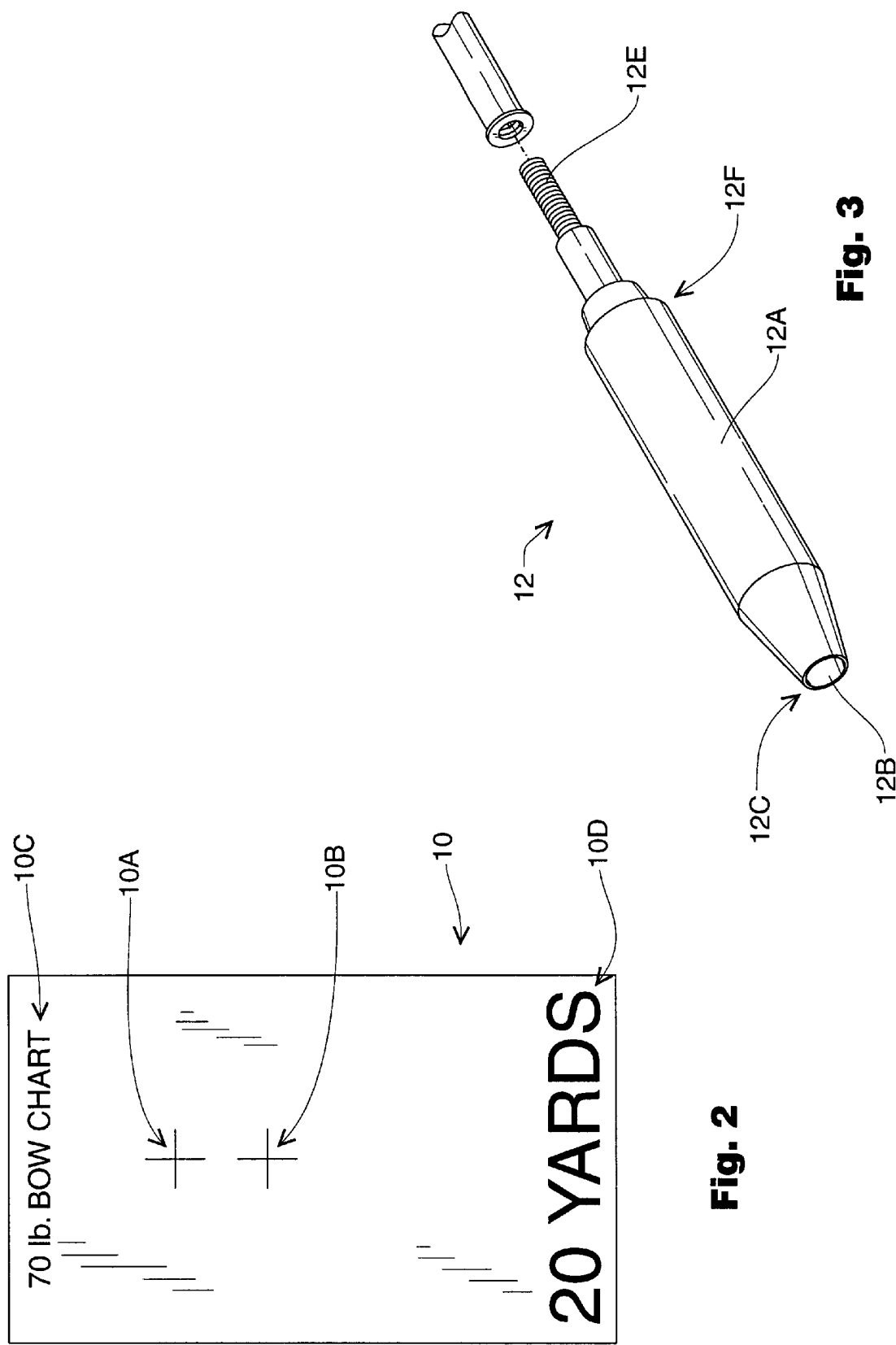

BOW SIGHT ALIGNMENT SYSTEM

BACKGROUND OF THE INVENTION

1. Field of the Invention

The present invention relates to archery equipment, particularly to apparatus and methods for aligning a bow sight.

2. Description of the Related Art

Currently, sights on bows are aligned by taking several shots at a target, and re-aligning the pin of the sight each time, based on the location of each shot arrow. This process is time-consuming and tiring, and does not provide for a very accurate alignment.

SUMMARY OF THE INVENTION

The bow sight alignment system of the present invention includes a laser adapted for attachment to an arrow such that a beam projected from the laser is collinear with an axis of a shaft of the arrow. A first target has a first marking and a second marking thereon.

The first and second markings are positioned such that when the laser is attached to the arrow, and the arrow is drawn on a bow, and the beam from the laser is projected on the second marking, and a person drawing the bow visually aligns the first marking with a sighting pin and a peep sight on a string of the bow, and the bow is a first pre-determined distance of about 10 feet away from the first target, the sighting pin is properly aligned for aiming the arrow without the laser thereon from the bow toward a second target which is positioned a second pre-determined distance away from the bow.

Because the arrow does not have to shot several times, or even one time to align the sight, a great deal of time and energy is saved by aligning the sight with the present invention.

Because the beam projected from the laser is collinear with the axis of the shaft of the arrow, a true alignment is possible.

Still further features and advantages will become apparent from the ensuing description and drawings.

BRIEF DESCRIPTION OF THE DRAWINGS

FIG. 2 is an elevational view of a target of the present invention.

FIG. 3 is an enlarged, exploded partial perspective view of a laser of the present invention and an end of a shaft of an arrow.

DETAILED DESCRIPTION

Figure 1:
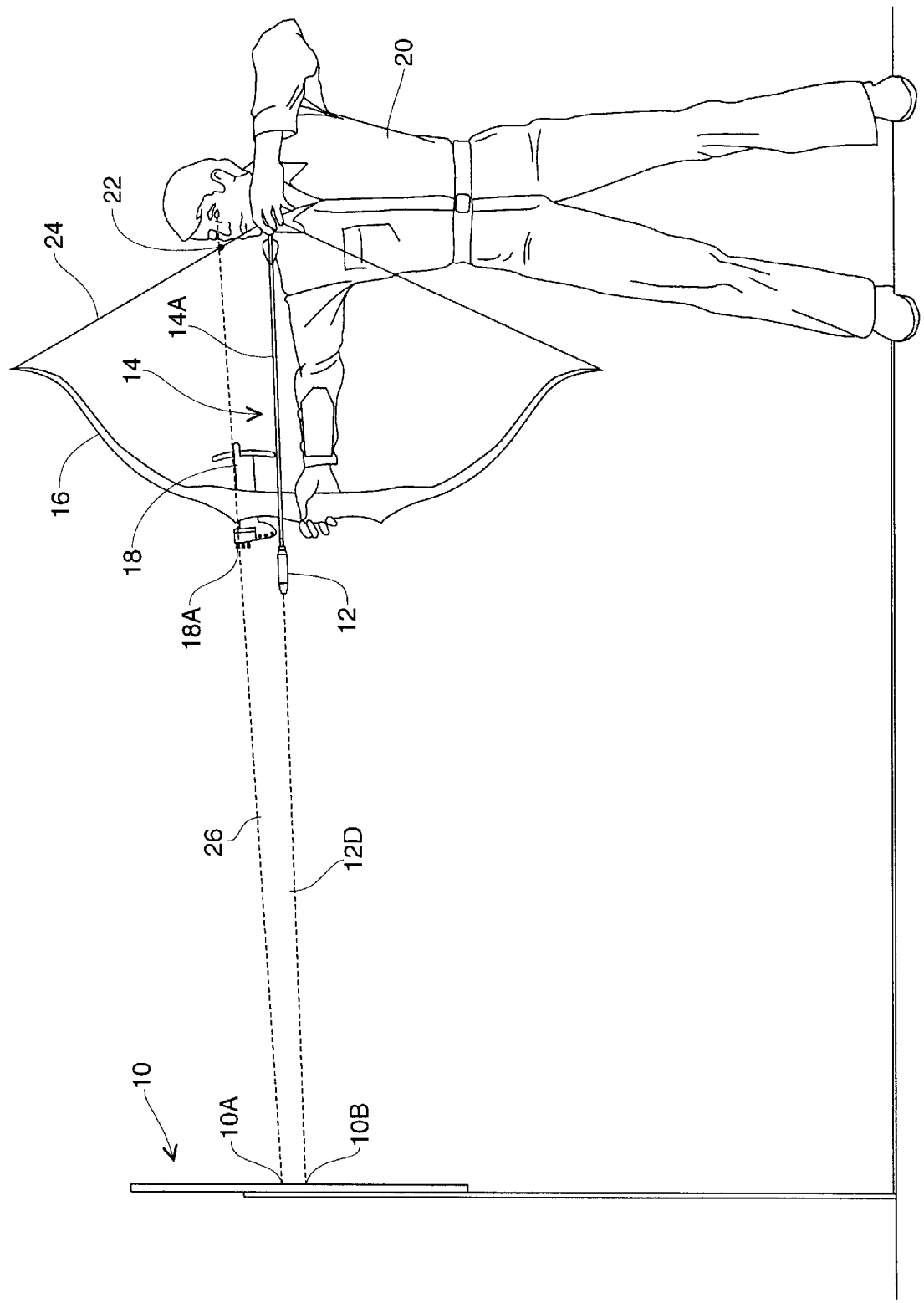
FIG. 1 is an elevational view of the present invention in use.

FIG. 1 is an elevational view of the present invention in use. FIG. 2 is an elevational view of a target 10 of the present invention. FIG. 3 is an enlarged, exploded partial perspective view of a laser 12 of the present invention and an end of a shaft 14A of an arrow 14.

Referring to FIGS. 1 and 3, a laser 12 comprises an elongated body 12A having an aperture 12B at a first end 12C of the body 12A through which a beam 12D projects in a collinear relationship to a longitudinal axis of the body 12A. A threaded rod 12E extends from a second end 12F of the body 12A. The laser 12 is attachable to the shaft 14A of the arrow 14 by removing the arrow tip (not shown), and threading the rod 12E into the shaft 14A. When the laser 12 is thus connected to the shaft 14A, an axis of the shaft 14A is collinear with the longitudinal axis of the body 12A, and the beam 12D projects in collinear relationship to the axis of the shaft 14A.

Although the preferred embodiment of the laser 12 is as shown and described, alternative laser constructions and methods for attaching to the arrow 14 are possible. Although it is preferred that the beam 12D project in collinear relationship to the axis of the shaft 14A, a less reliable but still acceptable sight alignment can still be performed if the beam 12D and the axis of the shaft 14A are not collinear, but are parallel and near to each other.

Referring now primarily to FIGS. 1 and 2, the target 10 has a first marking 10A and a second marking 10B thereon. The target 10 also includes a first indicia 10C, which indicates the draw weight of the bow 16 with which the target 10B should be used. The target 10 also includes a second indicia 10D, which indicates the target distance for which the bow sight 18 will be adjusted with this target 10. The location of the first and second markings 10A, 10B will vary based on the draw weight of the bow 16 to be used, and the target distance for which the bow sight 18 will be adjusted.

To use the present invention, an appropriate target 10 is selected, based on the draw weight of the bow 16 to be used, and the target distance for which the bow sight 18 will be adjusted. The arrow tip (not shown) is removed from the arrow 14, and the laser 12 is connected to the arrow 14 as shown in FIG. 3 and as described herein-before.

The archer 20 stands so that the bow 16 will be a pre-determined distance from the target 10B when the bow 16 is drawn, for example, 10 feet. A pre-determined distance for a particular target 10 is required for the bow sight 18 to be aligned properly.

The archer 20 draws the arrow 14 on the bow 16, and aims the beam 12D from the laser 12 until the beam 12D is projected on the second marking 10B.

The archer then sights the first marking 10A through a peep sight 22 on a string 24 of the bow 16, and aligns a sighting pin 18A of the bow sight 18 until the sighting pin 18A and the first marking 10A are on the same line of sight 26.

Once the sighting pin 18A has been aligned in this manner, the laser 12 may be removed, and the arrow tip (not shown) replaced on the shaft 14A. The archer 20 may now aim at a second target (not shown) which is equal to the target distance as shown on the second indicia 10D, and align the second target with the sighting pin 18A through the peep sight 22, and the archer 20 will be able to shoot accurately toward the second target.

It is understood that many factors affect the proper positioning of the first and second markings 10A, 10B on the target 10. These include the length and weight of the arrow 14 and the arrow tip (not shown), as well as the draw weight of the bow 16, and even such factors as the dimensions of the bow 16 and the pulley configuration of compound bows. These factors will be of even greater importance for longer target distances. Targets 10 may be made for specific bow and arrow combinations, or targets 10 may be made which are good for an average compound or recurve bow having a particular draw weight. When targets 10 are made for ranges of bows, it is understood that some accuracy will be sacrificed, particularly for longer target distances.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A bow sight alignment system adapted for use with a bow, an arrow and a second target, the system comprising:
   a. a laser adapted for attachment to the arrow such that a beam projected from the laser is generally parallel to an axis of a shaft of the arrow; and
   b. a first target having a first marking and a second marking thereon, the first and second markings positioned such that when the laser is attached to the arrow, and the arrow is drawn on the bow, and the beam from the laser is projected on the second marking, and a person drawing the bow visually aligns the first marking with a sighting pin and a peep sight on a string of the bow, and the bow is a first pre-determined distance away from the first target, the sighting pin is properly aligned for aiming the arrow without the laser thereon from the bow toward a second target which is positioned a second pre-determined distance away from the bow.

2. The bow sight alignment system of claim 1, wherein the laser comprises an elongated body having a longitudinal axis, an aperture at a first end of the body through which the beam projects in a collinear relationship to the longitudinal axis, and a connection means at a second end of the body adapted for connecting the laser to the shaft of the arrow such that the axis of the shaft is collinear with the longitudinal axis of the body.

3. The bow alignment system of claim 2, wherein the connection means is a rod adapted for insertion into the shaft.

4. The bow alignment system of claim 1, wherein the first target has indicia thereon indicating the second pre-determined distance, and indicia thereon indicating the range of bow draw weights for which the first target is useful.

* * * * *